(12) United States Patent  (10) Patent No.: US 8,284,839 B2
Chang et al.  (45) Date of Patent: Oct. 9, 2012

(54) JOINT SYSTEM FOR FRAME RATE CONVERSION AND VIDEO COMPRESSION

(75) Inventors: Te-Hao Chang, Taipei (TW); Chung-Yen Lu, Taipei (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 1098 days.

(21) Appl. No.: 12/143,854

(22) Filed: Jun. 23, 2008

(65) Prior Publication Data

US 2009/0316785 A1 Dec. 24, 2009

(51) Int. Cl.
 *H04N 7/26* (2006.01)
(52) U.S. Cl. .................. 375/240.16; 382/236
(58) Field of Classification Search .......... 375/240.12, 375/240.16, 240.26, 240.01, 240.24; 348/413.1, 348/416.1; 382/236
See application file for complete search history.

(56) References Cited

U.S. PATENT DOCUMENTS

| | | | |
|---|---|---|---|
| 5,247,355 A * | 9/1993 | Frederiksen | 375/240.12 |
| 6,118,487 A | 9/2000 | Hirtz | |
| 6,519,287 B1 * | 2/2003 | Hawkins et al. | 375/240.16 |
| 7,010,045 B2 | 3/2006 | Lee | |
| 7,551,673 B1 * | 6/2009 | Oh et al. | 375/240.16 |
| 2004/0179599 A1 * | 9/2004 | Lakshmanan et al. | 375/240.12 |
| 2004/0233990 A1 * | 11/2004 | Sekiguchi et al. | 375/240.16 |
| 2006/0165176 A1 | 7/2006 | Raveendran | |
| 2007/0092146 A1 * | 4/2007 | Alvarez et al. | 382/236 |
| 2007/0121724 A1 * | 5/2007 | Van Zon et al. | 375/240.16 |
| 2011/0211637 A1 * | 9/2011 | Blum | 375/240.16 |

FOREIGN PATENT DOCUMENTS

| | | |
|---|---|---|
| CN | 1175157 A | 3/1998 |
| CN | 1330493 A | 1/2002 |
| TW | 201002075 | 1/2010 |
| WO | 2008027508 | 3/2008 |

\* cited by examiner

*Primary Examiner* — Habte Mered
*Assistant Examiner* — Vincelas Louis
(74) *Attorney, Agent, or Firm* — Winston Hsu; Scott Margo

(57) ABSTRACT

A video processing apparatus includes a storage interface, where information and hardware of a motion estimation module and a motion compensation module are shared between frame rate conversion and video coding operations. The video processing apparatus therefore may perform both the frame rate conversion and video coding operations at the same time or perform them by turns, while requiring fewer resources and a smaller chip area than conventional methods.

21 Claims, 9 Drawing Sheets

JOINT SYSTEM FOR FRAME RATE CONVERSION AND VIDEO COMPRESSION

BACKGROUND

The present invention relates to a joint system for frame rate conversion and video compression, and more particularly, to a system that shares processes of a motion estimation module and a motion compensation module between frame rate conversion and video compression operations.

Please refer to FIG. 1, which is a diagram of a conventional ME/MC frame rate conversion circuit 100 that converts a film, movie or animated source having a sample rate of 24-30 Hz into a display video stream having a sample rate of 50-60 Hz or 100-120 Hz, the frame rate conversion circuit 100 includes a motion estimation circuit 110, a motion compensation circuit 120, and a storage unit such as a DRAM 130. The DRAM 130 temporarily stores input frames, and the motion estimation circuit 110 retrieves two frames (a current frame and a previous frame) from the DRAM 130 and compares them to generate a motion vector indicating the motion of a pixel corresponding to the location movement of the pixel from a previous frame to a current frame. The motion compensation circuit 120 also retrieves the two frames from the DRAM 130, which are processed together with the motion vector received from the motion estimation circuit 110 for generating a frame to be interpolated between the current frame and the previous frame.

After carrying out the above operations, which are collectively called frame rate conversion with motion judder cancellation (MJC), the output video has a higher frame rate than the input video with reduced judder artifact. The frame rate conversion circuit 100 can therefore correctly interpolate the intermediate frames even when the objects and background in the frames are moving.

Motion estimation and motion compensation are also utilized in video coding, as shown in FIG. 2. The video encoder 200 is utilized to compress the input video stream by removing the redundancy of the input frames; in other words, the output compressed stream of the video encoder 200 that is transmitted to the receiving end only includes the difference between each two adjacent frames. The receiving end then reconstructs the original frame stream by compensating for the difference.

The video encoder 200 therefore includes a DRAM 230 for temporarily storing input frames, and a motion estimation circuit 210 for retrieving two frames (i.e. an I-frame and a P-frame) from the DRAM 230 and comparing the two frames to generate a residue and a motion vector indicating the difference between the two frames. The residue is then encoded by a block encoding circuit 240, and sent to the bit stream generator 260 to generate a compressed bit-stream. A block decoding circuit 250 and a motion compensation circuit 220 simulate the operations that the receiving end takes to reconstruct the original frame stream: the block decoding circuit 250 decodes the encoded residue, and the motion compensation circuit 220 generates a reconstructed frame according to the residue generated by the block decoding circuit 250 and the motion vectors generated by the motion estimation circuit 210. The reconstructed frame, which is utilized as the P-frame in the next encoding cycle, is stored into the DRAM 230 before being retrieved by the motion estimation circuit 210.

However, the data compression and the frame rate conversion operations are always performed independently, which considerably wastes resources and requires a large chip area for the duplicate motion estimation circuits and motion compensation circuits.

SUMMARY

The present invention is therefore to provide a video processing apparatus that shares a storage interface and operation of a motion estimation module and a motion compensation module between frame rate conversion and video coding operations (or data compression). The apparatus may perform both frame rate conversion and video coding at the same time, or perform the operations by turns, while requiring fewer resources and a smaller chip area than conventional methods.

The sharing concept proposed in the present invention may further be implemented to combine other functionalities, such as de-interlacing, encoding, video NR, super resolution, and functions that require motion information generated by the motion estimation, in order to reduce the system resource requirement.

According to one exemplary embodiment of the present invention, a video processing apparatus for performing a video coding operation and a frame rate conversion operation on an input video stream is disclosed. The video processing apparatus comprises a storage module for storing the input video stream comprising a plurality of frames, a video coding module, a motion compensation module, and a motion estimation module. The video coding module encodes the input video stream, generates a compressed bit-stream according to a plurality of motion vectors. The motion compensation module is coupled to the storage module and the video coding module, and performs motion judder cancellation (MJC) on the input video stream to generate an output video stream according to the input video stream, and the motion vectors when in a conversion mode, and generates a reconstructed frame according to the input video stream and the motion vectors and stores the reconstructed frame into the storage module when in a coding mode. The motion estimation module is coupled to the storage module, the video coding module, and the motion compensation module, and extracts the input video stream from the storage module, generates the motion vectors according to the input video stream.

According to another exemplary embodiment of the present invention, a video processing method of performing a video coding and a frame rate conversion on an input video stream is disclosed. The method comprises storing the input video stream comprising a plurality of frames in a storage module; extracting the input video stream from the storage module, and generating a plurality of motion vectors according to the input video stream; encoding the input video stream to generate a compressed bit-stream according to the motion vectors; performing motion judder cancellation (MJC) on the input video stream to generate an output video stream according to the input video stream and the motion vectors; and generating a reconstructed frame according to the input video stream and the motion vectors, and storing the reconstructed frame into the storage module.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
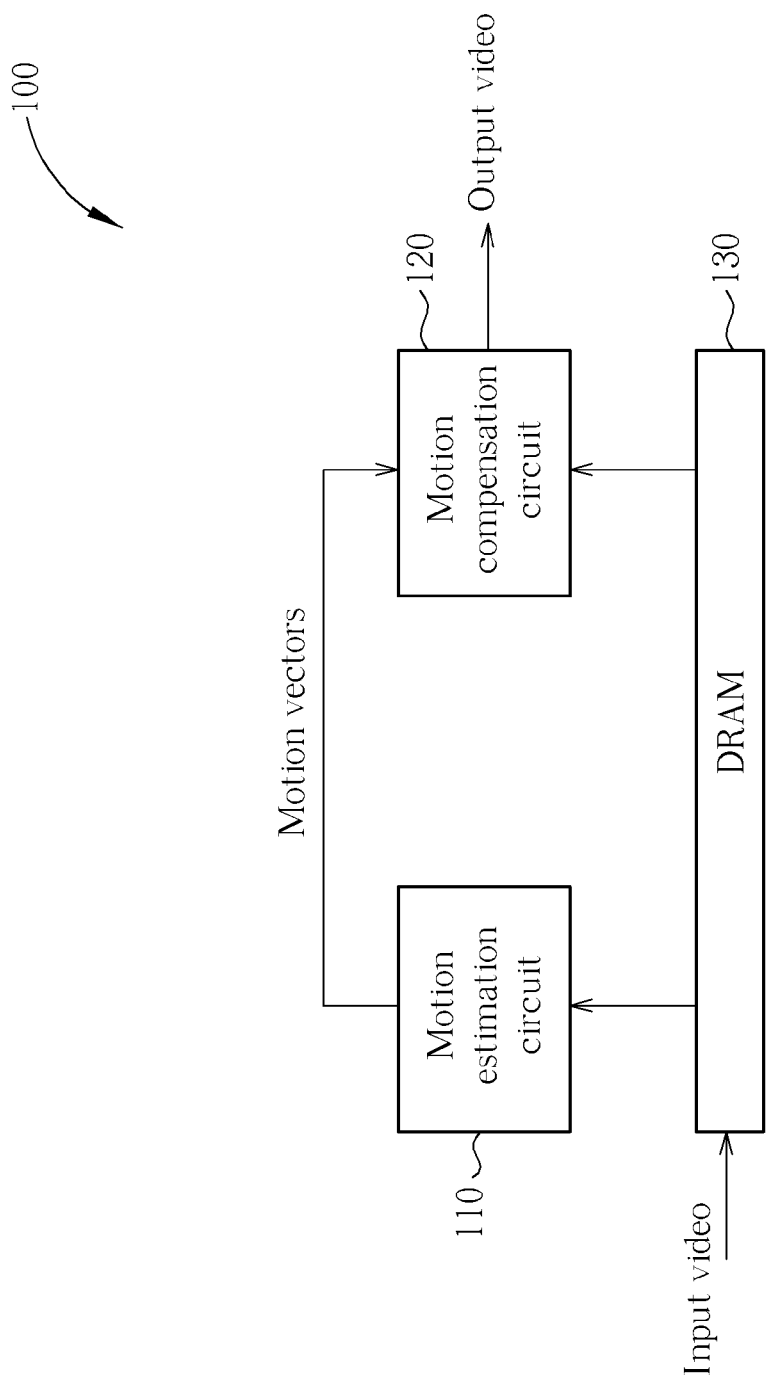
FIG. 1 is a block diagram of a conventional frame rate conversion circuit.
Figure 2:
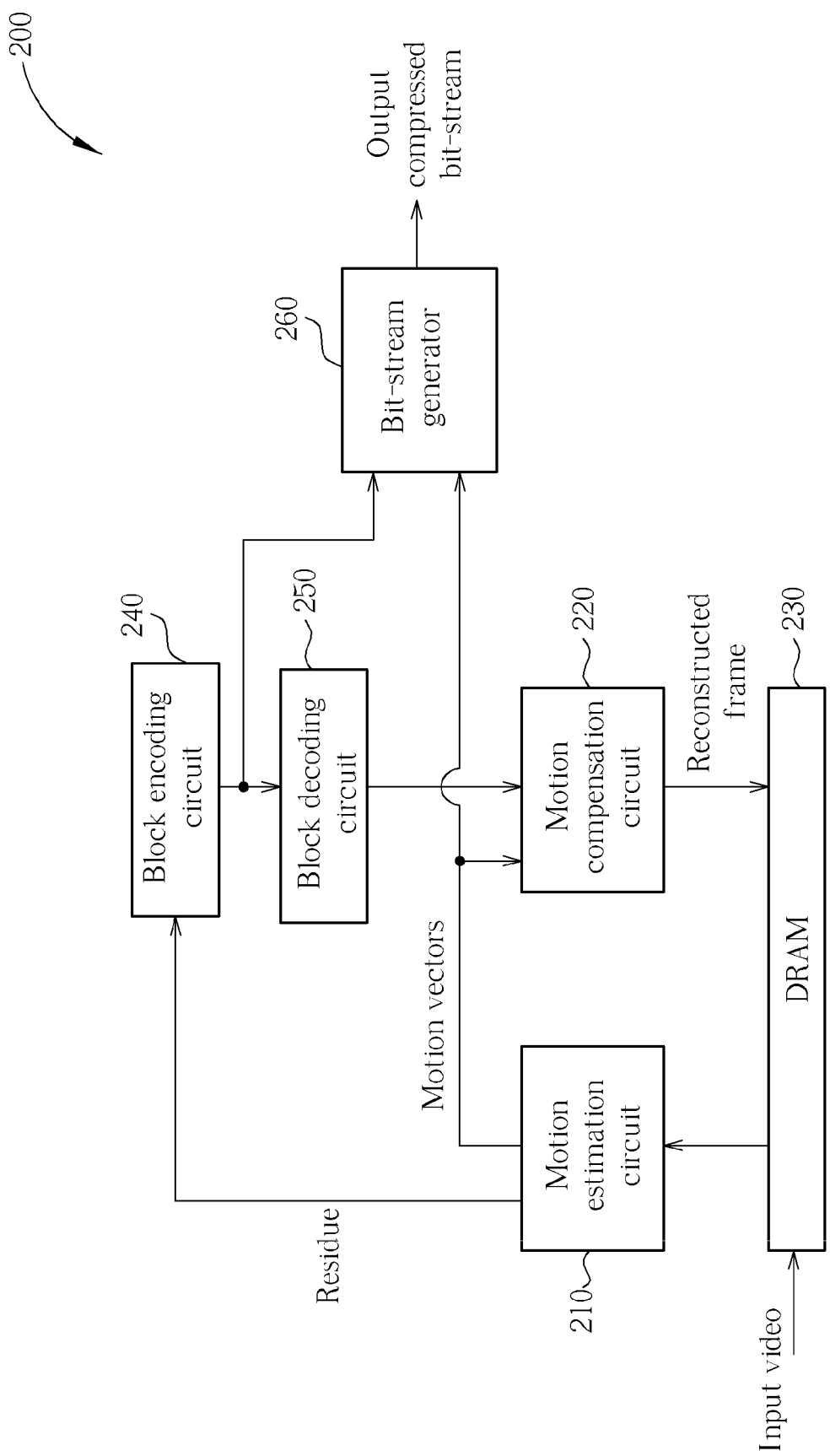
FIG. 2 is a block diagram of a conventional video encoder.
Figure 3:
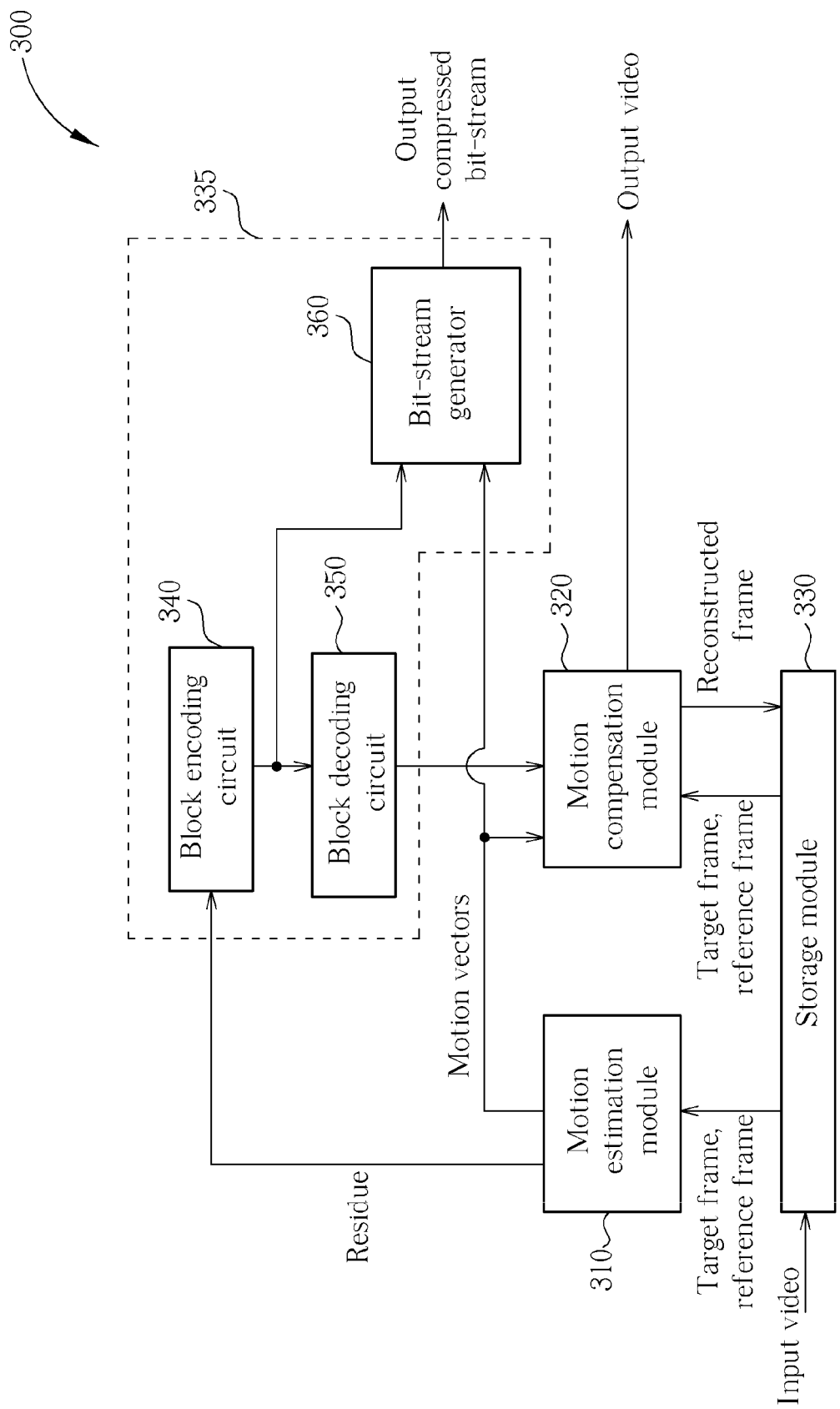
FIG. 3 is a block diagram of a video processing apparatus according to an exemplary embodiment of the present invention.

Please refer to FIG. 3, which is a block diagram of a video processing apparatus 300 according to an exemplary embodiment of the present invention. Unlike the conventional systems shown in FIG. 1 and FIG. 2 that each require one motion estimation module, one motion compensation module and one storage module to perform the frame rate conversion and video coding respectively, the video processing apparatus 300 is provided with both the frame rate conversion function and the video coding function while only one motion estimation module 310, one motion compensation module 320, one video coding module 335 and one storage module 330 are needed.

The storage module 330 can be a DRAM and stores an input video stream comprising a plurality of frames. In one embodiment, the motion estimation module 310 includes only one motion estimation unit, the motion compensation module 320 includes only one motion compensation unit, and the video processing apparatus 300 has two modes, a conversion mode and a coding mode.

When the video processing apparatus 300 is switched to the conversion mode, the video coding module 335 is controlled to become disabled, and the motion estimation module 310 and the motion compensation module 320 are configured to generate an output video stream having a frame rate different from the frame rate of the input video stream. For example, the motion estimation module 310 extracts a target frame and a reference frame from the storage module 330, and generates a motion vector according to the target frame and the reference frame. The motion vector is sent to the motion compensation module 320, which also extracts the target frame and the reference frame from the storage module 320 and generates interpolated frame(s) according to the target frame, the reference frame and the motion vector. The output video stream is generated after the motion compensation module 320 interpolates frames into the input video stream.

However, when the video processing apparatus 300 is in the coding mode, the video coding module 335 is enabled, while the motion estimation module 310 and the motion compensation module 320 are configured to perform the data compression procedure. The motion estimation module 310 extracts a target frame and a reference frame from the storage module 330 and generates a motion vector and a residue to the video coding module 335 and the motion compensation module 320 according to the target frame and the reference frame. A block coding circuit 340 in the video coding module 335 then encodes the residue to generate an encoded residue, and transmits the encoded residue to a bit-stream generator 360 and a block decoding circuit 350 in the video coding module 335. The bit-stream generator 360 generates the output compressed bit-stream according to the motion vectors and the encoded residue. Additionally, after the decoding of the encoded residue by the block decoding circuit 350, the processed residue along with the motion vectors and the reference frame are processed to generate a reconstructed frame, which is stored back into the storage module 320 by the motion compensation module 320.

The video processing apparatus 300 in this embodiment performs the frame rate conversion and the video coding at different time (the video processing apparatus 300 can only operate according to one mode each time) because the motion estimation module 310 and the motion compensation module 320 only include, respectively, one motion estimation unit and one motion compensation unit, controlled by a control signal that is selectively in the conversion mode or in the coding mode. However, the motion estimating methodology of the motion estimation module 310 can be different in the conversion mode and the coding mode in order to obtain the best solution. A first motion estimating methodology such as 3D Recursive Search (3DRS) may be adopted for frame rate conversion, and a second motion estimating methodology such as a Full search may be adopted for video coding.

Figure 4:
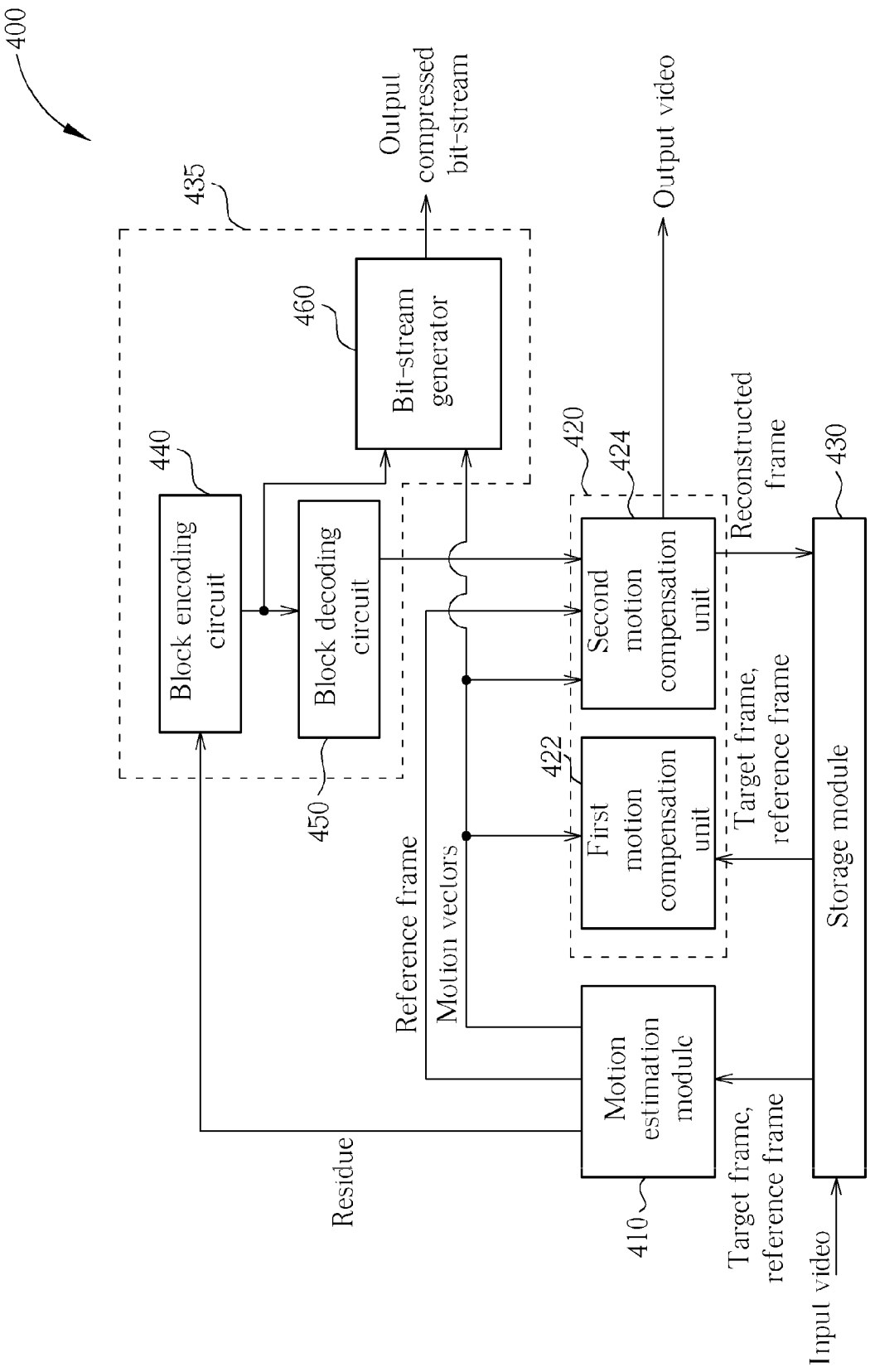
FIG. 4 is a block diagram of a video processing apparatus according to another exemplary embodiment of the present invention.

FIG. 4 shows a block diagram of a video processing apparatus 400 that can activate the frame rate conversion function and the video coding function at the same time according to one exemplary embodiment of the present invention. Compared with the above embodiment, the motion compensation module 420 of the video processing apparatus 400 is established with two motion compensation units 422 and 424, each of which is in charge of one function. For example, the first motion compensation unit 422 is in charge of frame rate conversion function; therefore, it extracts the target frame and the reference frame from the storage module 430, receives the motion vectors generated by the motion estimation module 410, and generates the output video stream having different frame rates from the input video stream according to the frames and the motion vectors. Meanwhile, the second motion compensation unit 424 is in charge of video coding; therefore, it generates the reconstructed frame according to the processed residue received from the coding module 435, the reference frame and the motion vectors received from the motion estimation module 410, and stores the reconstructed frame in the storage module 430.

As both the frame rate conversion function and the video coding function are, respectively, accomplished by a dedicated motion compensation unit, the video processing apparatus 400 does not require two modes, and therefore may not require switching functionality between two different modes. The two functionalities can be simultaneously performed, sharing motion estimation and storage interface. The bandwidth of the storage module 430 (e.g. DRAM) can be significantly reduced when compared to the conventional system that needs two motion estimation units and two motion compensation units to fulfill the frame rate conversion and video coding. Moreover, in this embodiment, the motion estimation module 410 generates the motion vectors according to a single motion estimating methodology no matter whether the motion vectors are for frame rate conversion purposes or video coding purposes since the two functions may take place at the same time. For example, the motion estimation module 410 may adopt the 3DRS methodology because, for the frame rate conversion, the 3DRS methodology is preferred.

Figure 5:
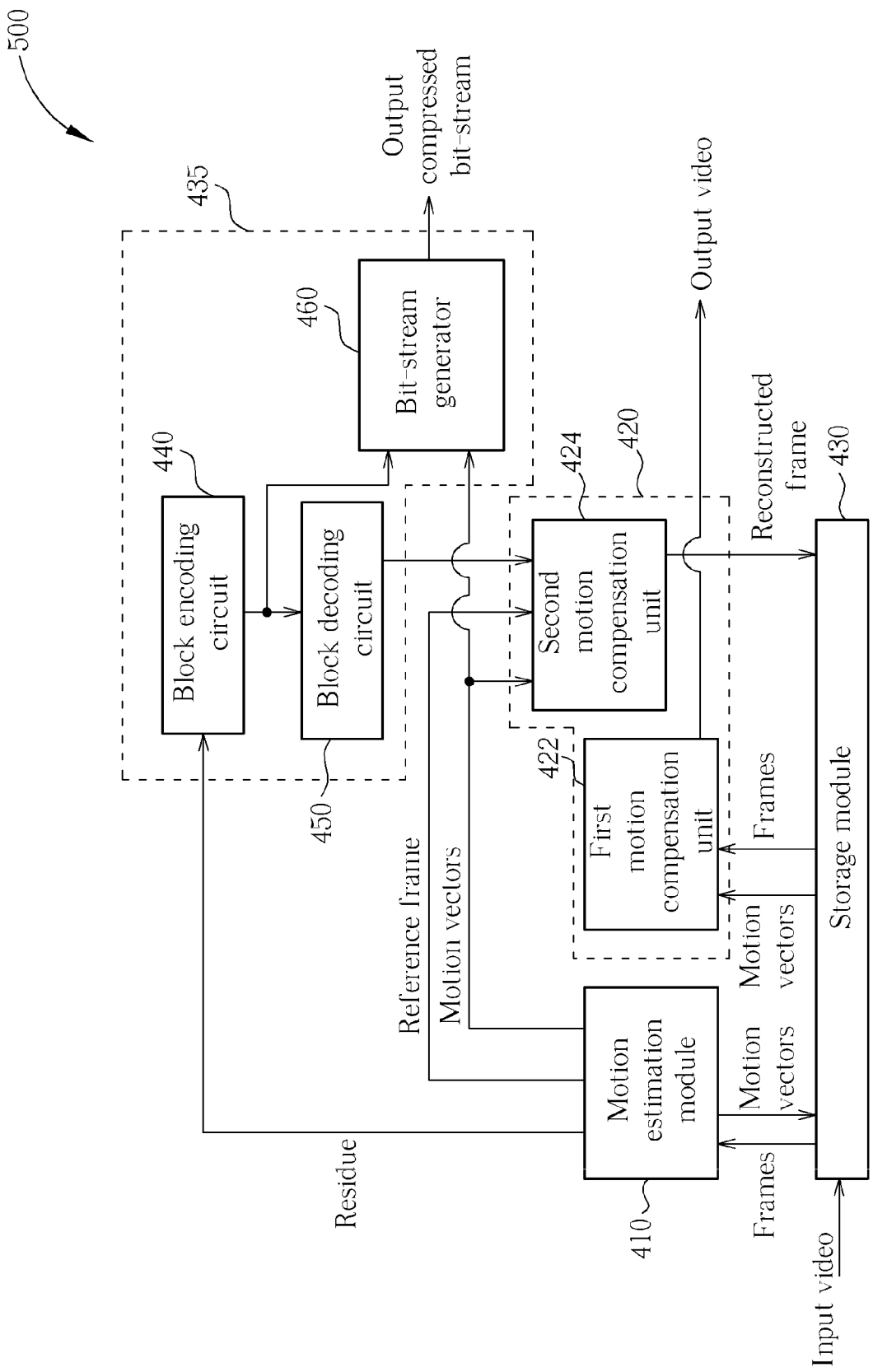
FIG. 5 is a block diagram of a video processing apparatus according to another exemplary embodiment of the present invention.

In consideration of the additional functionalities such as instant replay and rewind that a digital video system having the video processing apparatus 400 implemented therein may be provided with, a modified video processing apparatus 500 is shown in FIG. 5. The video processing apparatus 500 is able to perform video coding on a current video stream and perform frame rate conversion on previous video stream so that a display device, such as a TV in the digital video system, can replay or rewind previously received programs.

In this embodiment, the first motion compensation unit 422 and the second motion compensation unit 424 utilize different frames for frame rate conversion and video coding, respectively. Therefore, the motion estimation module 410 does not directly provide the motion vectors to the first motion compensation unit 422, but instead stores the motion vectors into a storage space (in FIG. 5, the storage space is allocated in the storage module 430; however, it can be allocated in another storage device), and the first motion compensation unit 422 further retrieves proper motion vectors from the storage space. In this way, the first motion compensation unit 422 can obtain motion vectors of a previous input video stream from the storage space to generate the output video stream having previously received programs when the instant replay/rewind function is enabled, while the second motion compensation unit 424 along with the video coding module 435 still generates the output compressed bit-stream representing the current input video stream.

Figure 6:
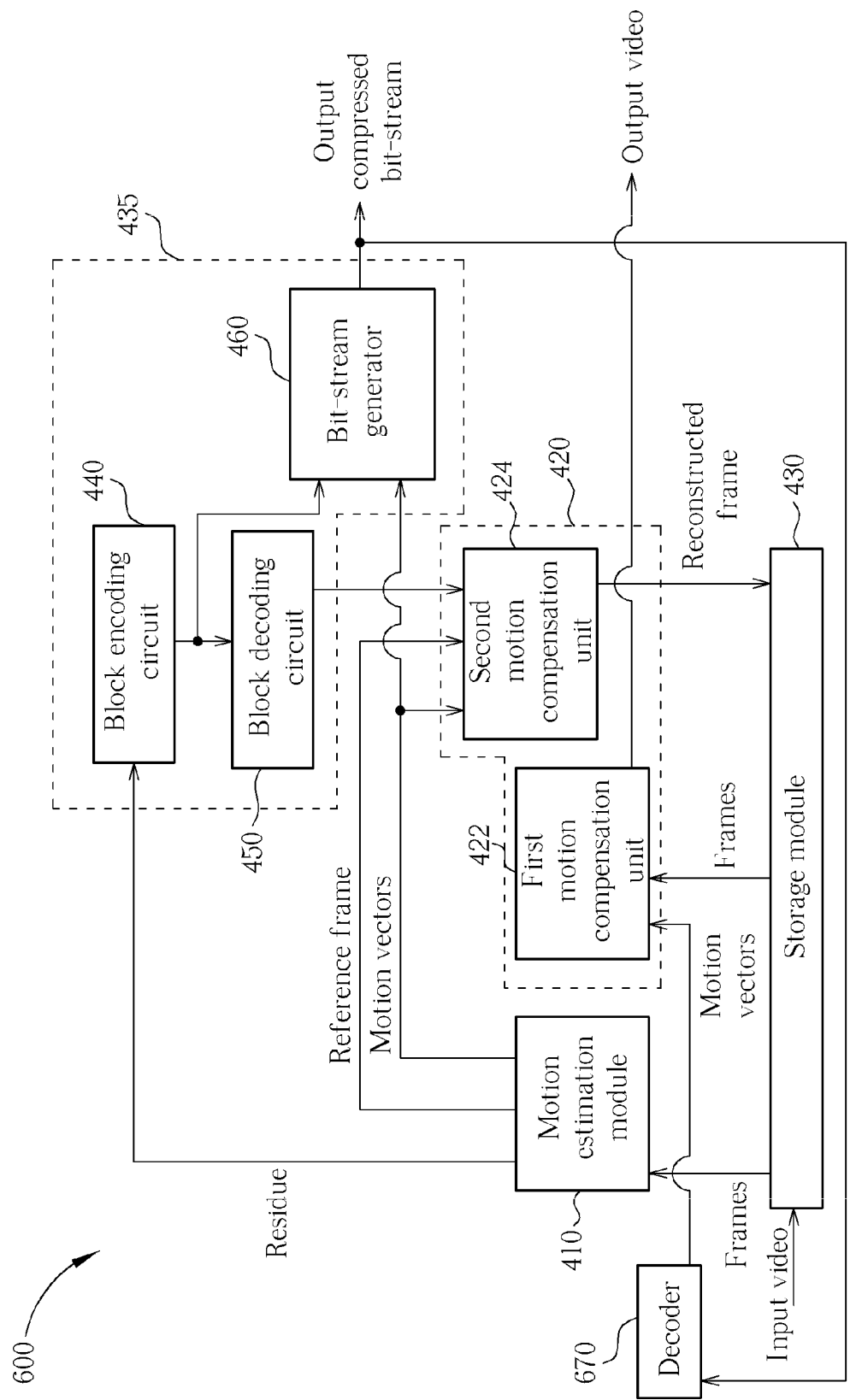
FIG. 6 is a block diagram of a video processing apparatus according to another exemplary embodiment of the present invention.

FIG. 6 is another embodiment of the video processing apparatus that supports instant replay and rewind functions. The video processing apparatus 600 further comprises a decoder 670 coupled to the bit-stream generator 460 and the first motion compensation unit 422. The bit-stream generator 460 packs the motion vectors received from the motion estimation module 410 into the output compressed bit-stream, and delivers the output compressed bit-stream to the receiving end (not shown) and the decoder 670. After the decoder 670 decodes the motion vectors from the output compressed bit-stream, the motion vectors can be utilized for next motion judder cancellation, which is performed by the first motion compensation unit 422.

Figure 7:
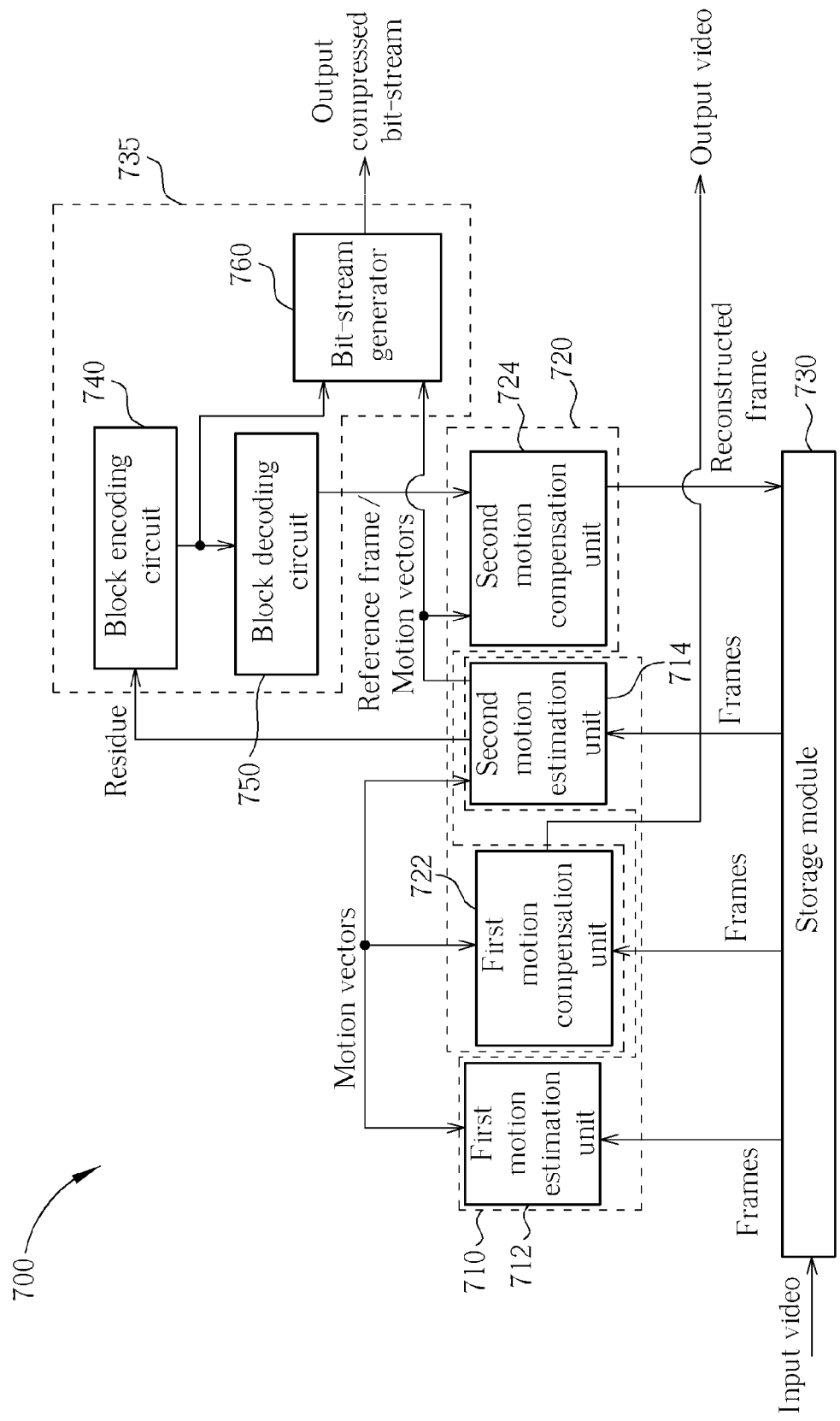
FIG. 7 is a block diagram of a video processing apparatus according to another exemplary embodiment of the present invention.

The following discloses a video processing apparatus according to another embodiment of the present invention. The video processing apparatus 700 shown in FIG. 7 includes two motion estimation units 712 and 714, and two motion compensation units 722 and 724, wherein the first motion compensation unit 722 is in charge of motion judder cancellation of frame rate conversion, and the second motion compensation unit 724 is in charge of video coding; these motion compensation units are substantially the same as the motion compensation units 422 and 424 disclosed above. Therefore, the video processing apparatus 700 can also activate the frame rate conversion and the video compression at the same time.

The first motion estimation unit 712 generates motion vectors to the first motion compensation unit 722, and the second motion estimation unit 714 generates motion vectors to the second motion compensation unit 724, and generates residue to the video coding module 735. However, the two motion estimation units 712 and 714 share essential information (e.g. motion vectors) between each other, thereby reducing the computation amount, and further improving the motion estimation performance.

For example, one motion estimation unit (for example, the second motion estimation unit 714) receives motion vectors generated by the other motion estimation unit (the first motion estimation unit 712) instead of generating the motion vectors itself. The advantages of reduced computation, faster convergence and improved compression efficiency are therefore achieved. After receiving the motion vectors from the first motion estimation unit 712, the second motion estimation unit 714 can refine the motion vectors according to a motion estimating methodology that is different from that used in the first motion estimation unit 712 in order to improve the efficiency and performance. For example, the first motion estimation unit 712 generates primary motion vectors according to the 3DRS methodology, and the second motion estimation unit 714 further refines the primary motion vectors from the first motion estimation unit 712 according to the full search methodology with a smaller search range, thereby reducing computation.

Note that the information shared between the first and second motion estimation units 712 and 714 is not limited to motion vectors, and the primary motion vectors can be generated by the second motion estimation unit 714 and refined by the first motion estimation unit 712.

Figure 8:
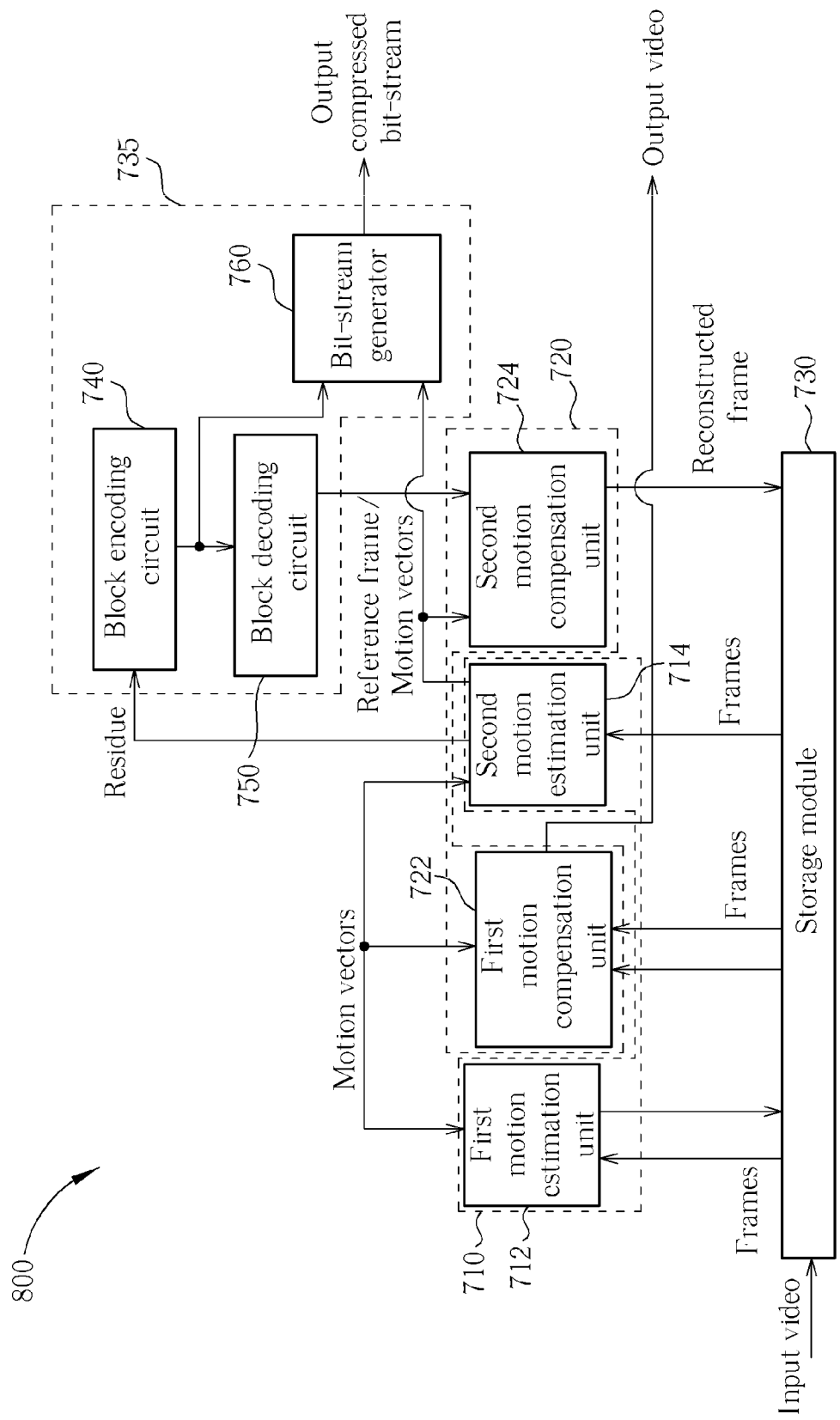
FIG. 8 is a block diagram of a video processing apparatus according to another exemplary embodiment of the present invention.
Figure 9:
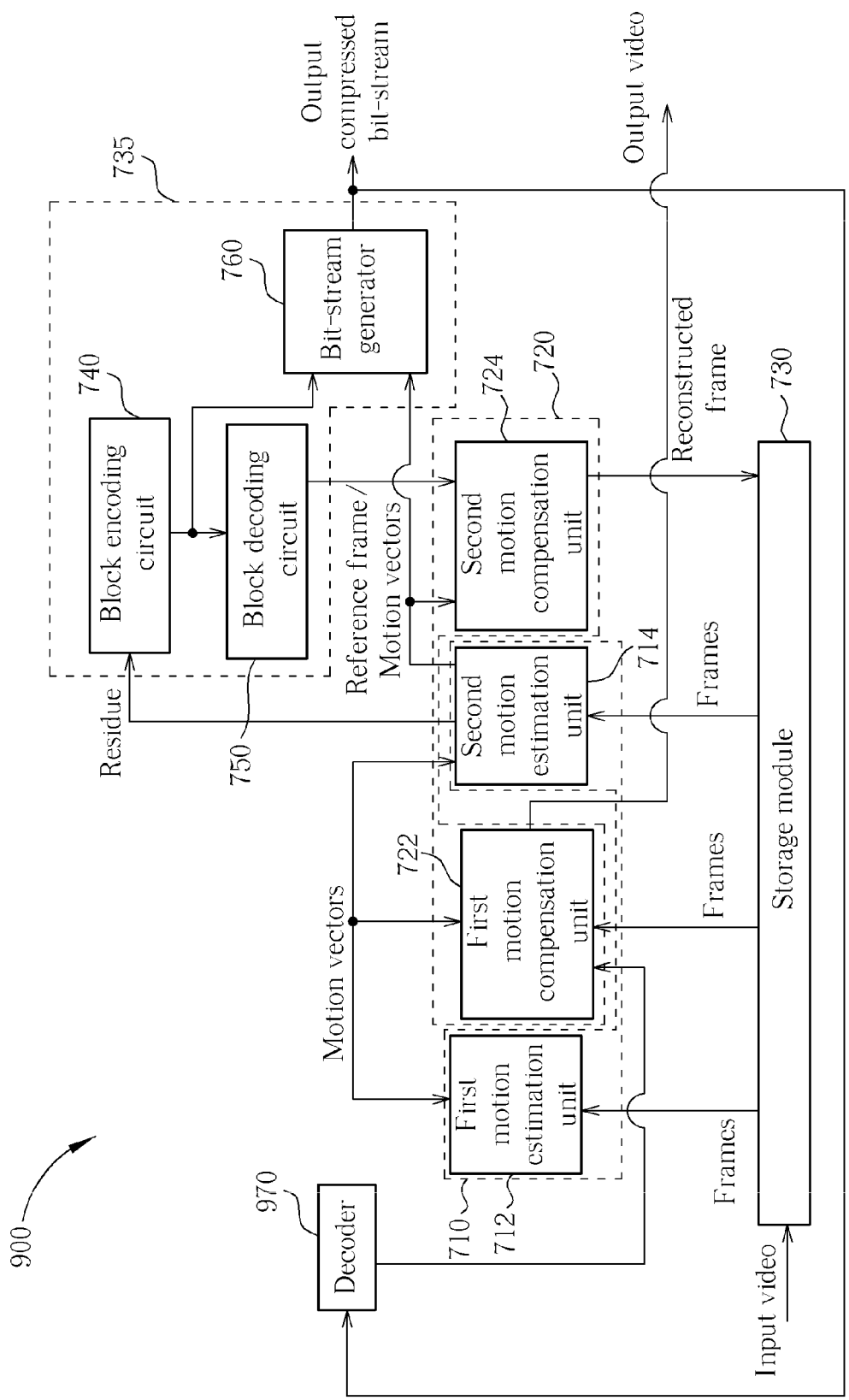
FIG. 9 is a block diagram of a video processing apparatus according to another exemplary embodiment of the present invention.

Similarly, the video processing apparatus 700 can be modified to support functions such as instant replay and rewind. Please refer to FIG. 8 and FIG. 9, which show diagrams of modified video processing apparatuses 800 and 900, respectively. The video processing apparatus 800 stores the motion vectors generated by the motion estimation module 710 (for example, the first motion estimation unit 712) to a storage space or to the storage module 730, and then the first motion compensation unit 722 retrieves proper motion vectors from the storage space or the storage module 730. In FIG. 9, a decoder 970 is added to decode the motion vectors included in the output compressed bit-stream, and provides the motion vectors to the first motion compensation unit 722. As these embodiments have already been detailed in the above, further description is omitted here for brevity.

In summary, in the above-mentioned embodiments, the motion estimation module may share information between the frame rate conversion and the video coding operations such as motion vectors, or share hardware such as a data address generator which extracts frames from the storage module, a block matching (SAD calculation) unit, an on-chip SRAM for caching the search range for block matching, a motion vector generator and storage, or a quarter pair interpolator able to make motion vectors more precise when the motion vector is not an integer. The motion compensation module may share a hardware-like data address generator, an on-chip SRAM for motion compensation, or a quarter-pair interpolator between the frame rate conversion and the video coding. Moreover, the sharing of an I/O interface and first-in-first-out (FIFO) access of the storage module, such as a DRAM, will also benefit the video processing apparatus.

When the video processing apparatus mentioned above is implemented in a TV product, it may support the frame rate conversion, instant replay application, and time shift application at low cost with reduced DRAM bandwidth by storing motion vectors into the storage module or another storage device. The data rate of the motion vectors is only 1% of the video stream, and therefore will not cause interference or performance degradation. When the TV set is in the normal mode, the first motion compensation unit performs the motion judder cancellation to retrieve the current motion vectors; when the TV set is in the delayed playback mode, however, the first motion compensation unit is controlled to retrieve the stored motion vectors.

Furthermore, the sharing concept proposed in the present invention can further extend to combine other functionalities, such as de-interlacing, encoding, video NR, super resolution, and functions that need motion information generated by the motion estimation and motion compensation. The system resource requirement may therefore be reduced.

Those skilled in the art will readily observe that numerous modifications and alterations of the device and method may be made while retaining the teachings of the invention.

What is claimed is:

1. A video processing apparatus for performing a video coding and a frame rate conversion on an input video stream, the video processing apparatus comprising:
    a storage module, for storing the input video stream comprising a plurality of frames;
    a video coding module, for encoding the input video stream, generating a compressed bit-stream according to a plurality of motion vectors;
    a motion compensation module, coupled to the storage module and the video coding module, for performing motion judder cancellation (MJC) on the input video stream to generate an output video stream according to the input video stream and the motion vectors when in a conversion mode; and
    generating a reconstructed frame according to the input video stream and the motion vectors and storing the reconstructed frame into the storage module when in a coding mode; and
    a motion estimation module, coupled to the storage module, the video coding module, and the motion compensation module, for extracting the input video stream from the storage module, generating the motion vectors according to the input video stream;
    wherein the motion compensation module comprises:
    a first motion compensation unit, coupled to the storage module, and the motion estimation module, for extracting the input video stream from the storage module, and performing motion judder cancellation (MJC) on the input video stream to generate the output video stream according to the input video stream and the motion vectors; and
    a second motion compensation unit, coupled to the storage module, the motion estimation module and the video coding module, for generating the reconstructed frame according to the input video stream and the motion vectors received from the motion estimation module, and storing the reconstructed frame into the storage module.

2. The video processing apparatus of claim 1, wherein the motion compensation module comprises only one motion compensation unit, and the motion compensation unit is controlled by a control signal to be switched between the conversion mode and the coding mode.

3. The video processing apparatus of claim 1, wherein the motion estimation module generates the motion vectors according to a first motion estimating methodology when the motion compensation module is in the conversion mode, and generates the motion vectors according to a second motion estimating methodology different from the first motion estimating methodology when the motion compensation module is in the coding mode.

4. The video processing apparatus of claim 1, wherein the motion estimation module generates the motion vectors according to a single motion estimating methodology.

5. The video processing apparatus of claim 1, wherein the first motion compensation unit directly receives the motion vectors from the motion estimation module.

6. The video processing apparatus of claim 1, wherein the motion estimation module further stores the motion vectors into a storage space, and the first motion compensation unit further retrieves the motion vectors therefrom.

7. The video processing apparatus of claim 5, wherein the storage space is allocated in the storage module.

8. The video processing apparatus of claim 1, further comprising a decoder, coupled to the video coding module and the first motion compensation unit, for decoding the compressed bit-stream to obtain the motion vectors included therein, and delivering the motion vectors to the first motion compensation unit.

9. The video processing apparatus of claim 1, wherein the motion estimation module comprises:
    a first motion estimation unit; and
    a second motion estimation unit for receiving motion vectors generated from the first motion estimation unit and generating motion vectors according to the motion vectors received from the first motion estimation unit and the input video stream;
    wherein one of the first and second motion estimation units generates and provides the motion vectors to the motion compensation module for MJC when in the conversion mode, and the other of the first and second motion estimation unit generates and provides the motion vectors to the motion compensation module for generating the reconstructed frame when in the coding mode.

10. The video processing apparatus of claim 9, wherein the first motion estimation unit generates motion vectors according to a first motion estimating methodology, and the second motion estimation unit generates motion vectors according to a second motion estimating methodology different from the first motion estimating methodology.

11. The video processing apparatus of claim 9, wherein the first motion estimation unit further stores motion vectors into a storage space, and the second motion estimation unit retrieves stored motion vectors from the storage space.

12. The video processing apparatus of claim 11, wherein the storage space is allocated in the storage module.

13. The video processing apparatus of claim 9, wherein the second motion estimation unit is coupled to the storage module and the motion compensation module, the first motion estimation unit is coupled to the storage module, the video coding module and the motion compensation module, and the video processing apparatus further comprises:
    a decoder, coupled to the video coding module and the second motion estimation unit, for decoding the compressed bit-stream to obtain the motion vectors included therein, and delivering the motion vectors to the second motion estimation unit.

14. A video processing method of performing a video coding and a frame rate conversion on an input video stream, the method comprising:
    (a) storing the input video stream comprising a plurality of frames in a storage module;
    (b) extracting the input video stream from the storage module, and generating a plurality of motion vectors according to the input video stream;

(c) encoding the input video stream to generate a compressed bit-stream according to the motion vectors;

(d) performing motion judder cancellation (MJC) on the input video stream by using a first motion compensation unit of a motion compensation circuit to generate an output video stream according to the input video stream and the motion vectors; and (e) generating a reconstructed frame by using a second motion compensation unit of the motion compensation circuit according to the input video stream and the motion vectors, and storing the reconstructed frame into the storage module.

15. The method of claim 14, wherein the step of generating the motion vectors in step (b) further comprises storing the motion vectors into a storage space, and the step (d) further comprises retrieving the motion vectors from the storage space.

16. The method of claim 15, wherein the storage space is allocated in the storage module.

17. The method of claim 14, wherein the step (d) further comprises decoding the compressed bit-stream to obtain the motion vectors included therein for generation of the output video stream.

18. The method of claim 14, wherein the step (d) further comprises generating motion vectors for generation of the compressed bit-stream according to the input video stream and the motion vectors generated in step (b).

19. The method of claim 18, wherein the step (b) generates the motion vectors according to a first motion estimating methodology, and the step (d) generates motion vectors according to a second motion estimating methodology different from the first motion estimating methodology.

20. The method of claim 14, wherein the step (e) further comprises generating motion vectors for generation of the reconstruction frame according to the input video stream and the motion vectors generated in step (b).

21. The method of claim 20, wherein the step (b) generates the motion vectors according to a first motion estimating methodology, and the step (e) generates motion vectors according to a second motion estimating methodology different from the first motion estimating methodology.

\* \* \* \* \*